United States Patent [19]

Wieck

[11] Patent Number: 4,682,736
[45] Date of Patent: Jul. 28, 1987

[54] EXTRACTOR IRRIGATION WOBBLE TUBE SYSTEM

[76] Inventor: Gregory J. Wieck, Chico Rte., Box 43, Enterprise, Oreg. 97828

[21] Appl. No.: 457,654

[22] Filed: Jan. 13, 1983

Related U.S. Application Data

[63] Continuation of Ser. No. 216,541, Dec. 15, 1980, abandoned.

[51] Int. Cl.[4] .............................................. B05B 3/18
[52] U.S. Cl. .................................... 239/736; 239/740
[58] Field of Search ............... 239/178, 183, 184, 188, 239/190, 711, 721, 177, 728–740

[56] References Cited

U.S. PATENT DOCUMENTS

| | | | |
|---|---|---|---|
| 3,951,165 | 4/1976 | Seger et al. | 239/177 |
| 3,970,102 | 7/1976 | Harvey | 239/183 |
| 4,149,676 | 4/1979 | Wieck | 239/184 |

FOREIGN PATENT DOCUMENTS

| | | | |
|---|---|---|---|
| 2026826 | 2/1980 | United Kingdom | 239/183 |
| 2026293 | 2/1980 | United Kingdom | 239/183 |

*Primary Examiner*—Andres Kashnikow
*Assistant Examiner*—Michael J. Forman
*Attorney, Agent, or Firm*—Klarquist, Sparkman, Campbell, Leigh & Whinston

[57] ABSTRACT

An irrigation system has a mobile extractor tube rig for moving along a series of water supply standpipes, which are connected to a buried mainline. The rig and/or the standpipes have seals for engagement at the time of transfer. Each standpipe has an upper portion mounted for adjusting movement to insure flush contact between an extractor tube and a standpipe to reduce leakage that otherwise would occur.

4 Claims, 10 Drawing Figures

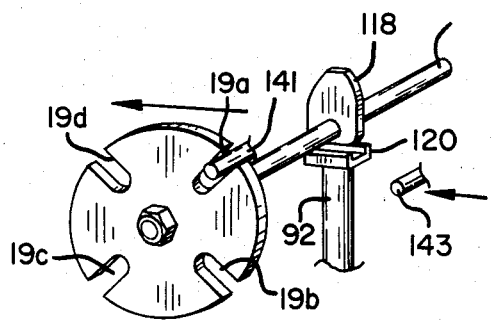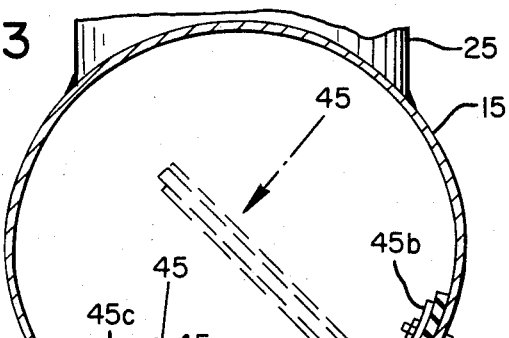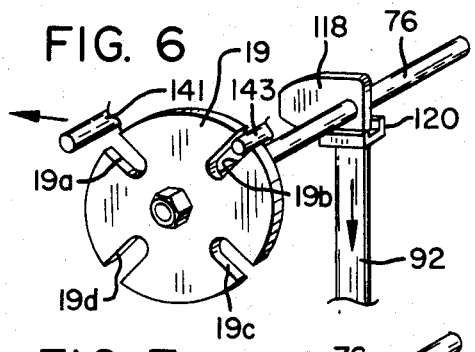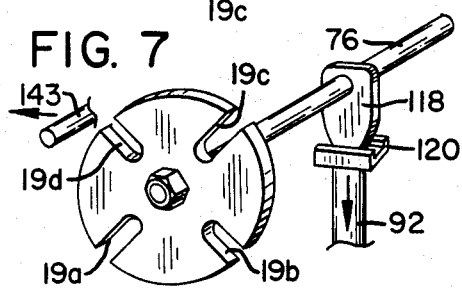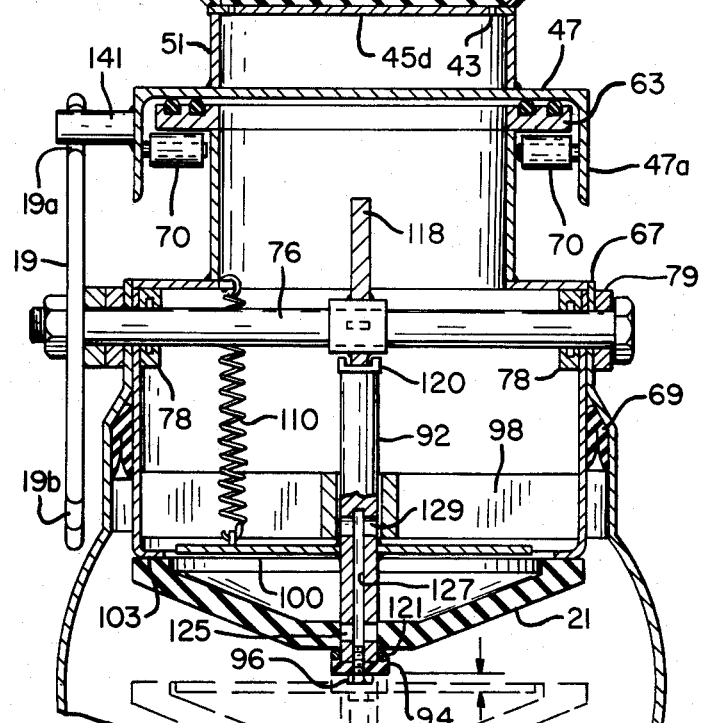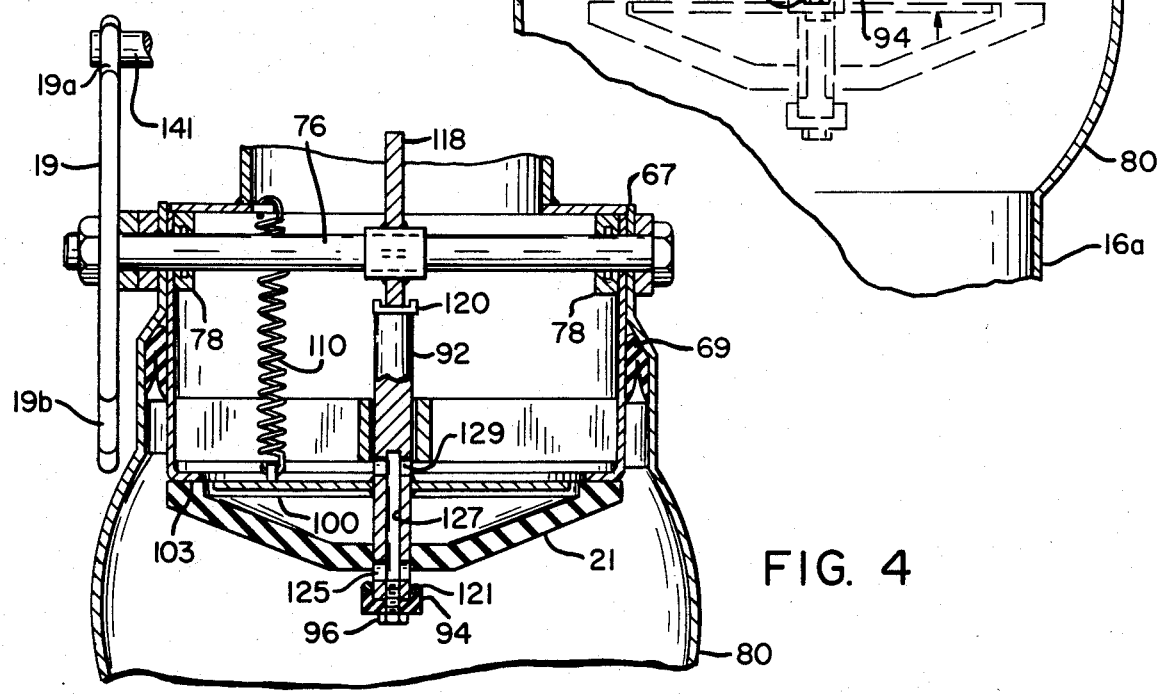

EXTRACTOR IRRIGATION WOBBLE TUBE SYSTEM

FIELD OF INVENTION AND BACKGROUND OF INVENTION

The present application is a continuation application of Ser. No. 216,541, filed Dec. 15, 1980, entitled "Improved Extractor Irrigation Wobble Tube System" now abandoned.

The present invention relates to irrigation systems and particularly to an improved system of the type shown in my prior U.S. Pat. No. 4,149,676 entitled "Extractors" which issued on Apr. 17, 1979. In my prior patent, in one embodiment of the invention, a wheeled rig pulls itself along by reeling in a cable, to effect sliding engagement of an extractor tube on the rig with a series of standpipes. In a second embodiment the standpipes drivingly engage the rig. In either form a mechanism on the rig successively opens valves in the standpipes to enable water under pressure to flow into the extractor tube successively from said standpipes. The extractor tube has sprinkling means for sprinkling the water on the ground to be irrigated. My prior patent mentions that a line move carrying sprinklers and movable with the extractor tube may be supplied with water by the tube.

In my prior system, the extractor tube engages rigid standpipe units, and while the seals permitted some out-of-flush contact, unwanted leakage could occur in certain terrain conditions.

It is here noted that the following references, in addition to the above recited patent, were cited by the Patent Office in connection with the original application on which the present application is based:
U.S. Pat. No. 3,970,102 Harvey, Class 239, sc 183
U.S. Pat. No. 3,951,165 Segar et al, Class 239,
British Pat. No. 2,026,826 Harvey, Class 239, sc 183
British Pat. No. 2,026,293 Harvey, Class 239, sc 183

SUMMARY OF THE INVENTION

An object of the present invention is to provide an improved irrigation system, and particularly one having features not found in my prior system.

Another object is to provide an extractor tube system wherein the tube rig and standpipes are designed to insure flush contact.

A further object is to provide a system as just described in which the standpipe includes a sealed wobble tube to insure flush contact.

DESCRIPTION OF THE DRAWINGS

FIG. 3 is a vertical section taken along line 3—3 of FIG. 2, but showing the valve closed;

FIG. 4 is a view like FIG. 3, but showing the valve cracked;

FIGS. 5, 6 and 7 are views of the valve operating mechanisms corresponding respectively to the valve positions in FIGS. 3, 4 and 2;

DESCRIPTION

Figure 1:
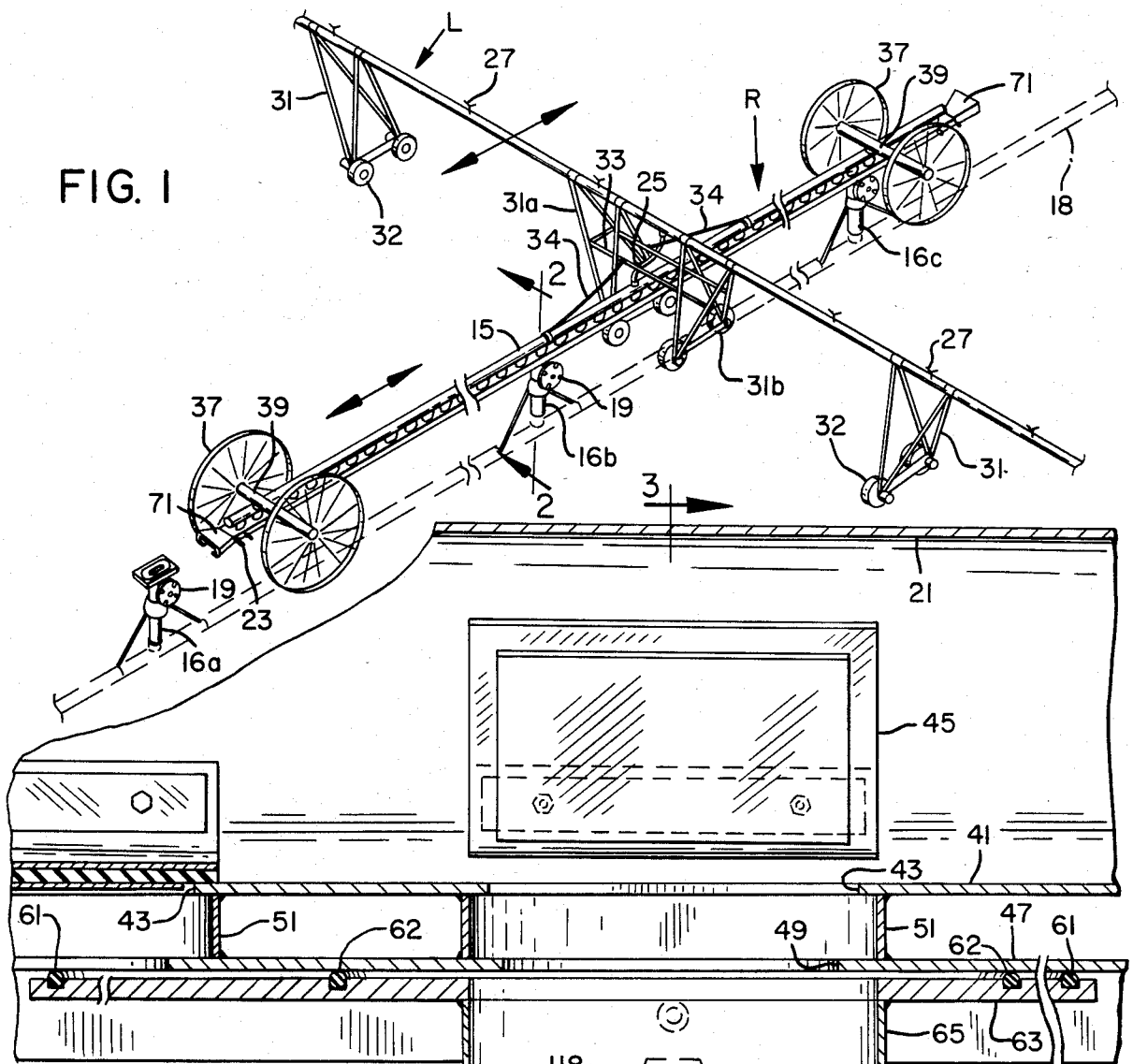
FIG. 1 is a perspective view of a single tube irrigation system incorporating the concepts of the present invention.

A general description of the invention is as follows:

FIG. 1 shows a linear irrigation line L extending at right angles and mechanically and hydraulically connected to an extractor tube rig R, the line being self-powered and pulling the rig along so that an extractor tube 15 on the rig slides in sealing engagement in successive fashion over a series of standpipes, three being shown in FIG. 1, and labeled 16a, 16b and 16c. The standpipes receive water under pressure from a buried mainline 18 which extends the length of the field to be irrigated. Each standpipe has a valve actuator 19 for its valve 21 (FIG. 2) and a forwardly located tripping mechanism 23 on the rig trips the actuator 19 to operate the valve when the extractor tube is in sealing engagement with a standpipe, so that water under pressure flows from the standpipe into the extractor tube, and from the tube through a hose 25 to the lateral line L, where it is discharged through the sprinklers 27.

More specifically, the line L has plural towers or frames 31 spaced therealong, provided with wheels 32 which are powered such as by hydraulic motors (not shown) of conventional form. The towers are kept in line by a conventional sensing arrangement (not shown).

The line L has a pair of towers 31a and 31b flanking the rig R and connected together by a framework 33. A pair of towing lines 34 connect the framework 33 to the rig R. The motorized wheels 32 are capable of driving the line in either direction, so that one of the towing lines tows the rig R in one direction when the line is moving one way, while the other towing line tows the rig R in the opposite direction when the line is moving the opposite way.

The rig R has fore and aft idler wheels 37 on axles 39 which can be fixedly connected to the tube 15, or connected by resilient connections to facilitate relative vertical movement between the axle and the remainder of the rig when the wheels are opposite a standpipe, thereby accommodating the system to variations in the terrain and the height of the standpipes.

Figure 2:
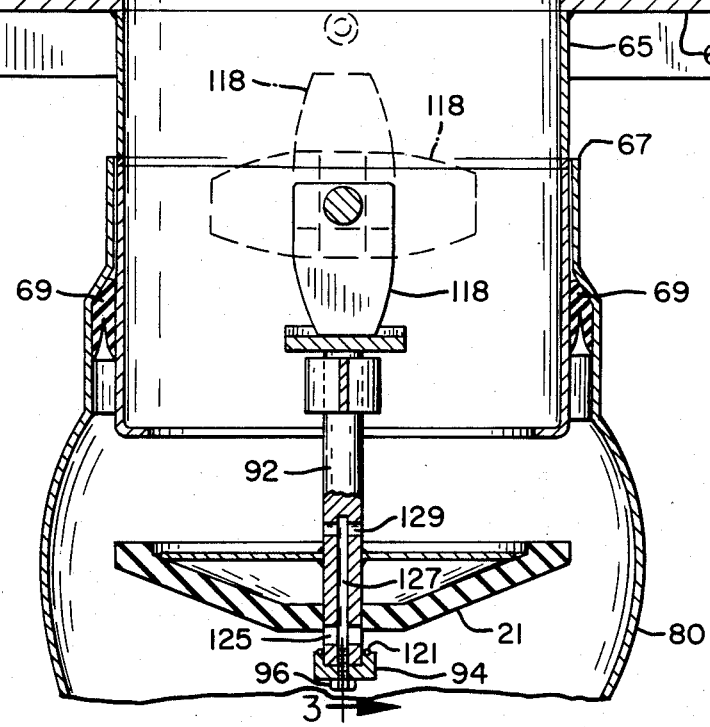
FIG. 2 is a vertical fragmentary longitudinal sectional view taken along line 2—2 of FIG. 1, showing, on an enlarged scale, the upper portion of a standpipe and its relation to the extractor tube, and showing the standpipe's valve opened.

The extractor tube 15 is closed at its ends and is of circular cross section except for being truncated at its bottom (FIG. 3), which is closed by a flat plate 41 (compare FIGS. 2 and 3). The plate is formed with plural uniformly spaced ports 43, normally closed by flap valves 45. Underlying the plate 41 and coextensive therewith is a contact plate 47 of channel form, which is provided with ports 49 aligned with ports 43. Plural tube sections 51 (FIGS. 1 and 2) connect extractor tube plate 41 and contact plate 47, and are concentric with ports 43 and 49.

Referring to FIGS. 2 and 3, contact plate 47 is adapted to slidably engage a pair of seals 61 and 62 on a flange 63 of a wobble tube 65. The tube constitutes the upper portion of the standpipe, and projects downwardly into the lower main standpipe portion, which for convenience is assigned the standpipe number. A seal 69 is provided between tube 65 and the lower standpipe portion.

Contact plate 47 has depending flanges 47a (FIG. 3) disposed next to the lateral edges of the flange 63 so as to provide lateral guides for maintaining the extractor tube properly aligned with each standpipe which it engages. The flanges 47a carry rollers 70 which project inwardly, and in such spaced relation to the web of the contact plate 47 that when the extractor tube rig A engages a standpipe, the side margins of the flanges 63 can and do fit between the rollers and the web, so that vertical guidance is provided. The fit can be such as to compress the O-ring seals 61 against the contact plate 47. Preferably, however, the fit is looser, so that the rollers act as retaining means. In such instance, the contact plate is preferably supported by the wheels 37 at a level slightly below that of the flange 63 of the standpipe, so that the flange supports the extractor tube rig at the standpipe to insure sealing contact at seals 61. In the event that there are resilient means between the axles 37 and the remainder of the rig, the flange need support only a portion of the weight it would otherwise have to bear.

Note that the rig is provided with a flared guide or snout 71 at each of its ends to insure proper initial engagement of the rig with each standpipe.

The wobble tube 65 is supported on the standpipe by a cross shaft 76 which projects through the side walls of the wobble tube and the lower standpipe portion. Sealing collars 78 are provided on the shaft next to the inner walls of the wobble tube, and retaining collars 79 are provided adjacent the outer walls of the lower standpipe portion. The shaft 76 has other functions which will be presently explained, but note at the present time that the shaft extends in a direction normal to the vertical longitudinal plane of the rig so that the wobble tube can tilt to adjust its position to adapt to tilting movement of the rig as the rig moves along, to insure flush contact.

Housed within a bulbous portion 80 of the lower standpipe portion is the valve 21 which is in the form of a concave disc through which a pushrod 92 slidably extends. A cap 94 is attached to the lower end of the pushrod by a nut 96, to limit downward movement of the valve on the pushrod.

A pushrod 92 slidably extends through a spider support 98 to be guided thereby, the support being secured within the lower portion of the wobble tube. The spider support allows the free passage of water from the standpipe upwardly into the wobble tube.

A circular pushrod plate 100 is secured to the pushrod 92 at a point below the spider support 98 as shown in FIG. 3. A tension spring 110 is attached between the pushrod plate and an upper portion of the wobble tube and urges the pushrod upwardly, which carries the valve 21 upwardly into seating engagement with a seat 103 formed on the lower end of the wobble tube.

Note that when the valve 21 is closed, the pushrod plate is spaced from the valve 21. A cam 118 on the cross shaft 76 operates when the shaft is turned to depress the pushrod 92 a predetermined amount by engaging a head 120 on the pushrod. The cam is formed with a pair of side flats, as is shown in FIGS. 5-7, so that when turned 90 degrees, one side flat rests on the head 120, the 90 degree movement serving to depress the pushrod to its FIG. 4 position, to separate an O-ring 121 around the pushrod from the bottom face of the valve 21 and to expose a cross hole 125 formed in the lower portion of the pushrod. This movement of the pushrod is insufficient to cause the plate 100 to apply an opening pressure on the valve 21, but facilitates travel of water under pressure into the pushrod and upwardly through a central bore 127 and outwardly through an upper cross hole 129 and enter into the wobble tube. At this time, the flap valve 45 is closed and held in such position by the water pressure in the extractor tube 15, so there is high pressure below the valve 21 and high pressure above the wobble tube. The water entering the wobble tube fills it to equalize the pressure across the valve 21.

Now, if the shaft 76 is turned 90 degrees from its FIG. 6 to its FIG. 7 position, the major lobe on the cam 118 engages the pushrod and has an end flat which rests on the head 120, to cause the cam to remain in its FIG. 7 position until turned therefrom. This movement to FIG. 7 causes further downward movement of the pushrod bringing the pushrod plate 100 into engagement with the valve 21 to open it. However, the valve, which was previously held in its seated position by the differential in pressure across the valve, now has nothing to hold it in its closed position and so opens quite readily. Water under pressure can now pass freely from the lower standpipe portion through the wobble tube and open the flap valve 45 and enter the extractor tube 15.

The valve actuator 19 has previously been mentioned, but only in general terms. As shown in the specific embodiment of the invention disclosed, the actuator is of disc form, the disc being provided with four relatively deep slots 19a, 19b, 19c and 19d. The actuator is fixedly secured to the cross shaft 76.

The tripping mechanism, previously generally referred to, includes a pair of actuating pins 141 and 143 on the extractor tube rig at each end thereof, just axially inwardly of the associated guide 71. The spacing of the pins is such that after the extractor tube rig has properly engaged the flange of a standpipe, the first pin 141 will move into slot 19a and turn the actuator 90 degrees, as shown in FIGS. 5 and 6, and then leave the slot. This action turns the cam 118 from its FIG. 5 to its FIG. 6 position to partially depress the pushrod 92. This in a sense, cracks the valve 21 (albeit the valve is not actually opened, the cracking being achieved by the internal passageway in the pushrod).

The spacing between the actuating pins 141 and 143 is such that there is a dwell period sufficient to enable water under pressure to fill the wobble tube and equalize the pressure on the opposite sides of the valve 21, whereupon the trailing actuating pin 143 will enter slot 19b to turn the pushrod and its cam 118 90 degrees to the FIG. 7 position. At this time the major lobe on the cam has fully depressed the pushrod to fully open the valve 21 and dispose the cam with a flat surface of the cam in engagement with the head of the pushrod.

Now, as the extractor tube rig moves past the standpipe, water flows into the extractor tube with the valve 21 opened and this continues until such time as the other pair of actuating pins 141 and 143 engage the disc actuator and function to close the valve. The closing sequence will be generally the reverse of the opening sequence, i.e., the pushrod will first be caused to move upwardly to its FIG. 4 position, when the cam is turned 90 degrees, under the influence of spring 110. Then shortly, the cam will be turned another 90 degrees back to its FIG. 5 position, at which time the spring 110 will, through the pushrod plate, cause the valve 21 to seat against the seat 103.

The flap valve 45 previously mentioned is and of itself not much different from the flap valve in prior U.S. Pat. Nos. 3,447,751 and 3,608,676. As shown in FIGS. 2 and 3 the flap valve comprises a strip or pad of elastomer material 45a secured by a clamp 45b to the extractor tube 15. Stiffening plates 45c and 45d are provided at the port 43 so as to make the flap valve form sustaining.

FIG. 1 shows that the rig R has a length greater than twice the distance between adjacent standpipes. This means that the rig will always be in engagement with at least two standpipes. The lateral guidance provided by the flanges 47a and their relation to the side edges of the flanges 63 of the standpipes, means that the rig is guided by the standpipes for movement along the length of a field in aligned condition to the row of standpipes and to the buried mainline 18.

Figure 8:
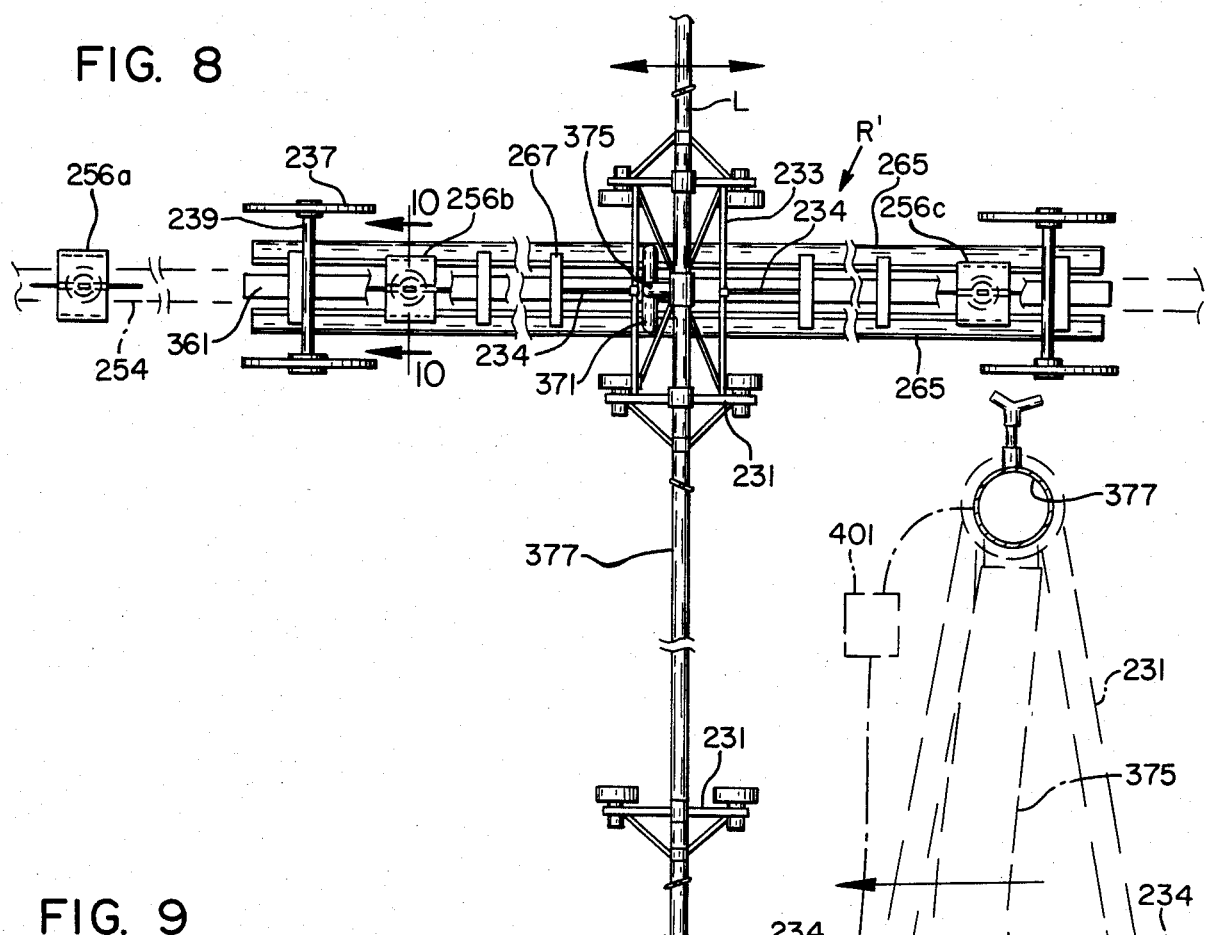
FIG. 8 is a top view of a system having double extractor tubes.
Figure 9:
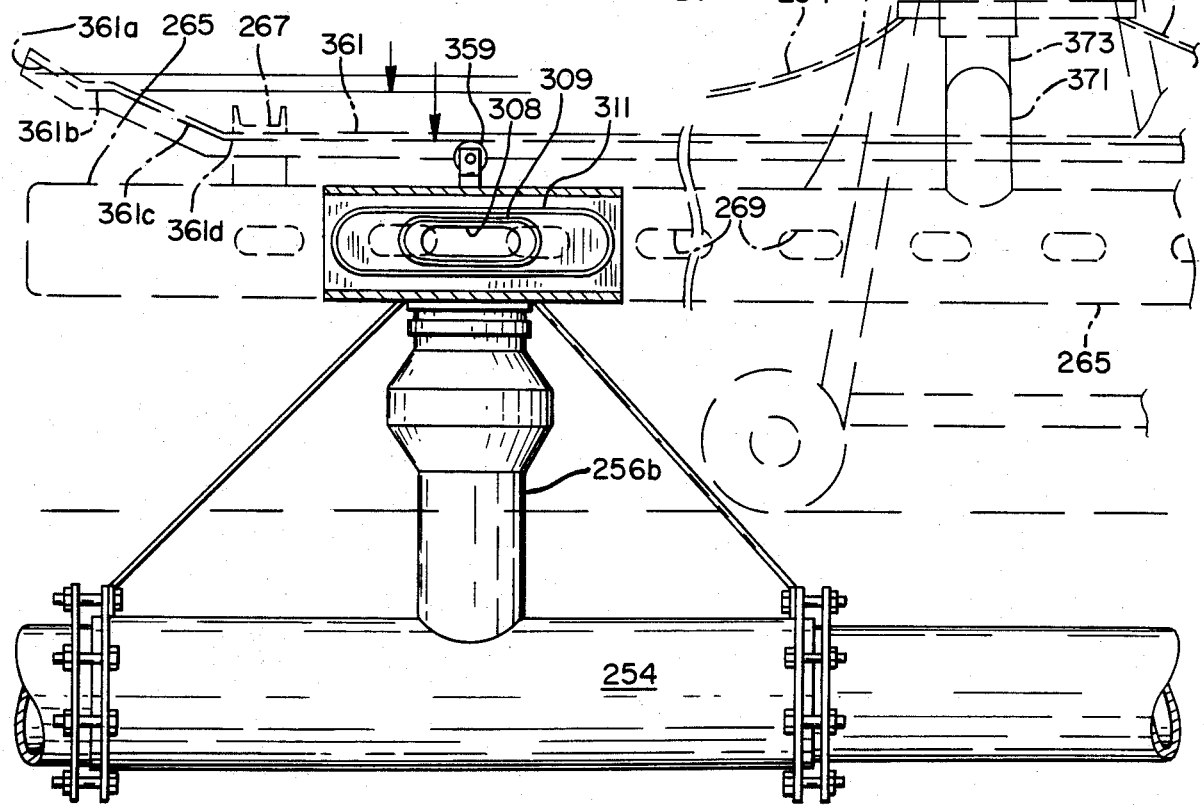
FIG. 9 is a vertical section taken along line 9—9 of FIG. 10.
Figure 10:
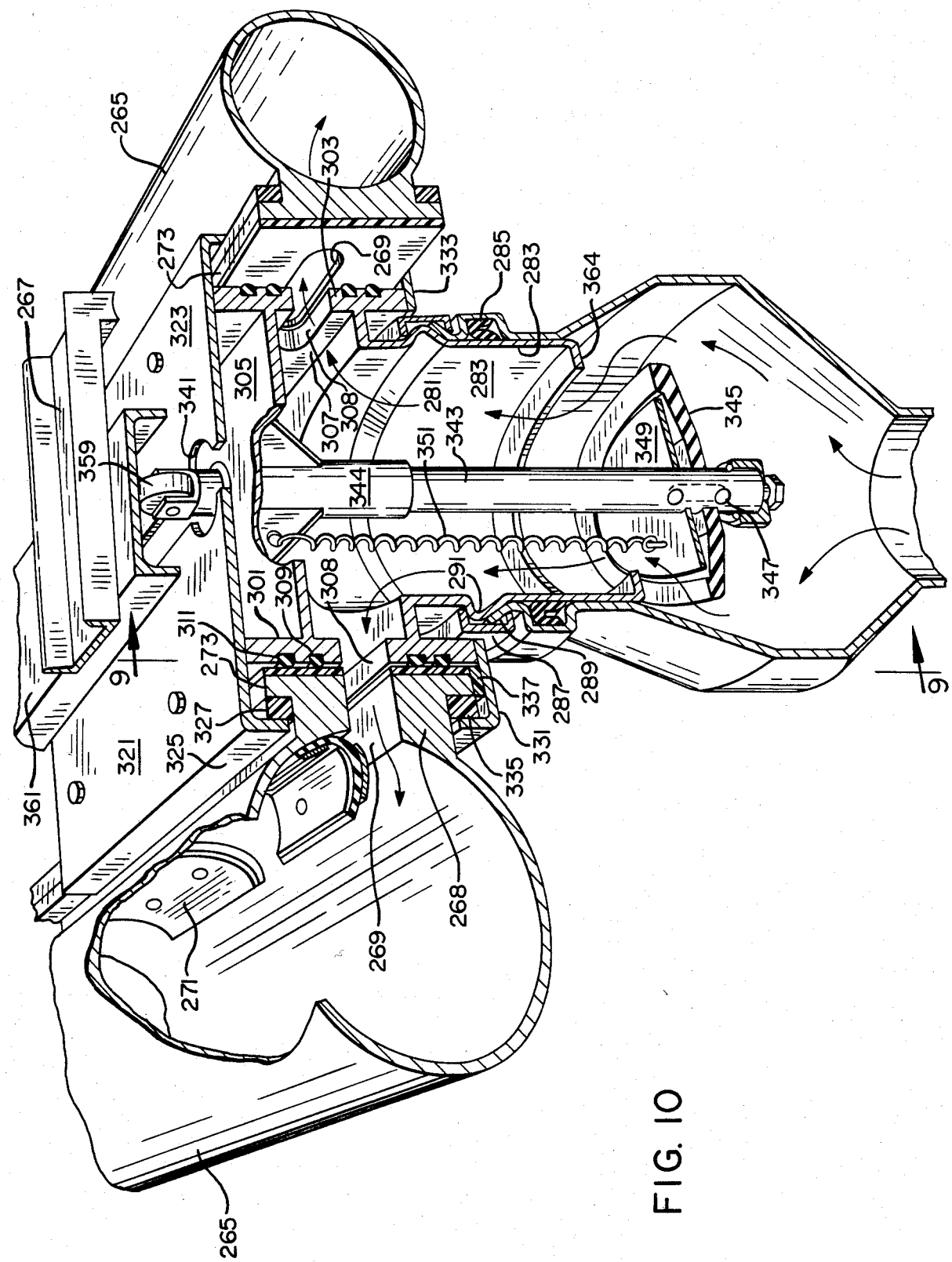
FIG. 10 is a vertical sectional perspective view through the system, taken at a standpipe.

FIGS. 8, 9 and 10 show a system having a pair of extractor tubes instead of a single tube. FIG. 8 shows a lateral linear line L supported by wheeled towers 231, like towers 31. Towing lines or equivalent structure 234 are provided between a framework 233 and an extractor tube rig R'. The rig is supported fore and aft, and if desired, intermediately, by idler wheels 237 on axles 239.

Water is supplied to rig R' from a buried line 254 (FIG. 9) through a series of standpipes, three being shown in FIG. 8 and labeled 256a, 256b and 256c.

The rig has a pair of parallel extractor tubes 265, which are rigidly connected together by a series of arched bridges 267 (compare FIGS. 8 and 10). Each tube has a thickened inner wall 268 (FIG. 10) formed with plural horizontally elongate ports 269 normally closed by flap valves 271. Each wall 268 is provided with a pair of oppositely directed flanges 273 which are slidably and sealingly received by an upper standpipe portion or head 281 at each standpipe.

The head has a lower tubular portion 283 (FIG. 10) projecting into the lower standpipe portion and sealed at 285. A retainer clip 287 engages a lip 289 on the lower standpipe portion, and a bulge 291 on the tubular portion 283.

The head at its upper portion is of rectangular shape and includes a pair of spaced parallel vertical contact plates 301 and 303 connected by spaced parallel horizontal walls 305 and 307 which straddle a series of ports 308 formed in the contact plates. Each contact plate carries a pair of horizontally elongate O-rings 309 and 311 (FIG. 9), which surround ports 308 and sealingly engage flat sealing layers 313 and 315, which are respectively provided on the inner faces of the walls 268 of the extractor tubes.

Upper guide plates 321 and 323 are secured to the upper edges of the contact plates 301 and 303, respectively, and have downwardly extending flanges 325 slidably and sealingly engaging strips 327 carried by flanges 273.

There are similar lower guide plates 331 and 333 secured to the bottom edges of the contact plates, and engaging sealing strips 335 on flanges 273. The flanges have bottom sealing strips 337 slidably engaging the upper faces of lower guide plates 331 and 333. Upper strips like 337 may be provided.

The upper guide plates are recessed to provide a clearance opening 341 to accommodate a pushrod 343. The latter slidably extends through a journal or bearing 344 fixed to the wall 305, and extends downwardly into the lower standpipe portion. The pushrod coacts with a disc valve 345 in the same manner as does pushrod 92 with disc valve 21. Thus pushrod 343 has an angular equalizing passage 347 and has a plate 349 connected by a tension spring 351 to gussets on the journal or bearing 344.

However, the pushrod 343 is actuated differently from pushrod 92 and has a cam engaging roller 359 on its upper end. An elongated cam plate 361 (FIGS. 9 and 10) is designed to engage the roller 359 and extend substantially the full length of the rig. The cam plate is in alignment with the pushrods of the various standpipes, and is fixedly mounted in place on the bridges 267. At each of its ends, the cam plate is upwardly flared (FIG. 9) to provide an upwardly and outwardly inclined first depressing portion 361a, a dwell portion 361b, a second depressing portion 361c, and a second dwell portion 361d.

In the FIGS. 8–10 form of the invention, the provision of two tubes balances the water pressure forces that tend to push a single tube away from a standpipe. Also, since the sealing contact between the tubes and the standpipes is in vertical planes, no wobble adjustment of the standpipes is required (so the standpipe can be rigid).

In operation, the spring 351 (FIG. 10) will normally effect seating of the valve 345 against a seat 364, but engagement by the depressing portion 361a of the cam plate with pushrod roller 359 presses the pushrod downwardly sufficiently to expose the passage 347 without, however, opening the valve. Then, although the rig continues to move, the dwell portion 361b gives time to allow equalization of pressure across the valve prior to engagement of the second depressing portion 361c with the pushrod. The latter engagement causes opening of the valve, which is maintained by the second dwell portion 361d, until such time as the pushrod is released by the trailing end of the cam plate.

FIG. 9 best shows the relationship of the extractor tube ports 269, port 308, and the O-rings 309 and 311 on the near side contact plate. The horizontal dimensions of the ports 269 and O-rings will be referred to as their lengths. There are two aims for the relationship (1) to avoid leakage and (2) to achieve a substantially uniform water supply rate. These aims are achieved by (1) spacing apart the center lines of adjacent ports by the length of the inner O-ring 309, (2) making the port length slightly less than one-half the length of the inner O-ring 309, and (3) making the outer O-ring 311 twice the length of the inner O-ring.

With the above proportions, no port bridges or spans the inner O-ring while another port is bridging or spanning the outer O-ring. So there is no circuitous path along which water can flow from port 308 to the outside. Hence, leakage is kept to a minimum.

Such proportions also mean that as one port is eclipsed by the inner O-ring, the trailing port is being exposed at substantially the same rate. Thus the port exposure at any time is equal to substantially the length of a port. This gives a substantially uniform rate of flow.

The above described relationship is also present in the FIG. 1 form of the invention, regarding extractor ports 49, inner O-ring 62 and outer O-ring 61 (FIG. 2).

Again referring to FIG. 9, the two extractor tubes are connected by a bridging pipe 371 which has an outlet section 373 connected by a hose 375 to the irrigation pipe 377 of line L.

Not shown in FIG. 8 is that the walls 268 and their flanges 273 are tapered at their ends for ready entry into the slots provided by the head of a standpipe. In addition, the head of a standpipe can be flared somewhat to provide for ready initial engagement between the head and the extractor tube assembly.

What is claimed is:

1. An assembly for an irrigation system, said assembly comprising:
   a standpipe adapted for connection to a supply of water,
   said standpipe having a stationary lower portion,
   and having an upper portion with an upwardly facing outlet,
   valve means in said standpipe,
   an extractor tube adapted to be carried along and to be brought into engagement with the upper portion of said standpipe for extracting water therefrom,
   and common means for actuating said valve means and for supporting the upper portion of said standpipe on the lower portion in a manner to facilitate adjustable or adaptive movement of said upper portion relative to said extractor tube.

2. An assembly as recited in claim 1 in which said common means includes a cross shaft interconnecting the upper and lower portions of said standpipe and providing for pivoting movement of the upper portion relative to the lower portion.

3. An assembly as recited in claim 2 wherein said cross shaft has means operatively interconnecting it to said valve means.

4. An assembly as recited in claim 3, in which the upper portion projects downwardly into said lower portion,
   and sealing means independent of said common means providing a seal between said upper and lower portions of said standpipe.

* * * * *